United States Patent Office  3,117,952
Patented Jan. 14, 1964

3,117,952
METHOD OF IMPROVING CERTAIN
CATALYSTS
Lewis S. Meriwether, Norwalk, Conn., assignor to American Cyanamid Company, New York, N.Y., a corporation of Maine
No Drawing. Filed Nov. 17, 1958, Ser. No. 774,151
10 Claims. (Cl. 260—94.1)

The invention in this case relates to an improved method of polymerizing acetylenes in the presence of a nickel-carbonyl-phosphine catalyst. More particularly, the invention lies in treating the nickel-carbonyl-phosphine catalyst with a non-reactive acetylene prior to the actual polymerization.

It has been found that reactions such as those disclosed and claimed in application Serial No. 774,152, filed concurrently herewith, now U.S. Patent No. 2,961,330, issued November 22, 1960, may be carried out at much lower temperatures if the nickel-carbonyl-phosphine catalyst is first treated with an acetylene which is non-reactive under the conditions employed in the polymerization, that is, an acetylene which cannot be made to polymerize in solution, either alone or in the presence of such catalyst. This group of acetylenes may be represented by the general formulas (I) 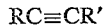 $RC \equiv CR'$ (II) 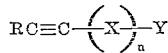

wherein R and R' are members of the class consisting of alkyl, aryl, alkaryl, aralkyl, hydroxy-substituted alkyl, cycloalkyl, and diaminoalkyl groups, X represents at least one member of the class consisting of —RC=CH—, —CH=CR—, —C≡C—; Y represents at least one member of the class consisting of —CH=CHR, —CR=CH$_2$, and —C≡CR; and $n$ represents a number from 0–100. In most cases, treating the catalysts merely entails heating a mixture of the non-reactive acetylene and the catalyst in a solvent such as benzene, cyclohexane or acetonitrile prior to the actual polymerization. Not only may these preconditioned catalyst systems be used to polymerize acetylenes into linear polymers, but they also may be used to polymerize acetylenes to aromatic polymers such as those disclosed in the prior art [see Kleinschmidt, U.S. Patent No. 2,542,417; Rose et al., J. Chem. Soc., 69 (1950), and Reppe et al., Annalen, 560, 104 (1948)]. In all known acetylene polymerization reactions, including both the linear and the aromatic polymerizations, the temperature has had to be raised above room temperature before any reaction was noted. Prior art uses of these nickel-carbonyl-phosphine catalysts suggests that these preconditioned catalysts may be used for polymerizations other than acetylene polymerizations; for example Reppe et al (see above) discloses catalytic polymerization of olefins with nickel-phosphine-halide and nickel - carbonyl-phosphine catalyst. However, these polymerizations were carried out under superatmospheric pressures and high temperatures in an autoclave.

It was quite unexpected that these nickel-carbonyl-phosphine catalysts should become more catalytically active when they are heated with a non-reactive acetylene as described briefly above and more fully hereinafter, since no reason for this phenomena is apparent and nowhere in the prior art is such treatment of the catalyst suggested. Furthermore, the fact that these disubstituted acetylenes have proved to be unreactive should lead one away from their use; therefore, adding them directly to the catalyst-solvent mixture is a very unobvious improvement to prior polymerizations of acetylenes. The fact that these polymerizations may be carried out at much lower temperatures makes it possible to carry out polymerizations on unstable or highly reactive acetylenes at low temperatures where "cleaner" reactions are possible. It also makes it possible to polymerize some acetylenes which heretofore have been almost unreactive.

It is an advantage of the present invention that non-reactive acetylenes constitute a class that covers a large variety of acetylenes which can be used in treating the catalysts, thus providing a source which is extensive and easily attained. Examples of specific acetylenes which may be used are dimethylacetylene through dioctadecylacetylene, 1-phenylpropyne-1, dibenzylacetylene, benzylmethylacetylene, ditolylacetylene, dicyclohexylacetylene, cyclohexylphenylacetylene, tolylmethylacetylene, tolylphenylacetylene, benzylphenylacetylene, benzyltolylacetylene, and 1-phenyl-1-propyne-3-ol. Contemplated further are all variations of the above substituent groups. Of course, the commercially available disubstituted acetylenes such as the 2-, 3- and 4-octynes, 5-decyne, diphenylacetylene, 3,5-dimethyl-3-hexyne-2,5-diol, 3,6-dimethyl-4-octyne-3,6-diol, 2-butyne-1-ol, 3-octyne-1-ol, and diethylacetylene are most desirable.

In addition to these disubstituted acetylenes, the linear polymer products of the reaction itself are also operative as preconditioning non-reactive acetylenes, as are other linear polymers which are disubstituted acetylenes. These linear polymer products, which are described more fully in copending application Serial No. 774,152, are specifically all of the dimers through the decamers and higher of monomethyl through monooctadecyl acetylene, cyclopropyl through cycloheptyl, etc., are operative. Polyacetylene compounds, such as 2,7-dimethyl - 3,5-octadiyne-2,7-diol, may be used. From the investigation of these non-reactive acetylenes it has been shown that the scope of the above examples is sufficiently broad to include substantially all disubstituted acetylenes.

In general, the reaction of the invention takes place similarly to those described in the aforementioned copending application Serial No. 774,152, and in the prior art, depending on the particular reactant employed, the products desired, and other influencing factors. The improvement is simple and straightforward and merely entails adding a relatively small amount of a non-reactive acetylene in the range of one part of non-reactive acetylene to 300 parts of a solution of the nickel-carbonyl-phosphine catalyst in the solvent medium, and refluxing the solution.

Another interesting feature of this treatment of the nickel-carbonyl-phosphine catalyst is that if this treatment is extended for such a period, which would normally exhaust the nickel-carbonyl-catalyst solution's effectiveness, the catalytic qualities of the complex are preserved. In other words, the herein-disclosed treatment of a nickel-carbonyl-phosphine catalyst with a non-reactive acetylene may be considered to preserve the catalyst.

The non-reactive acetylenes which are disclosed above and represented by Formulas I and II do not react to form linear or aromatic polymers. However, the scope of this invention is not intended to be limited thereby, since many other acetylene derivatives which are also nonreactive, as defined above, may be considered to be effective in preconditioning the catalyst.

The nickel-carbonyl-phosphine catalysts which are to be included in this invention may be represented by the general formulas II  $Ni(CO)_{4-n}(RR'R''P)_n$ and III 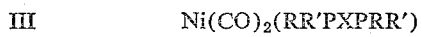 $Ni(CO)_2(RR'PXPRR')$ wherein $n$ is a whole number from 1 to 2 inclusive, R, R' and R" are members of the class consisting of alkyl, aryl, alkoxy, aryloxy, and cyanoalkyl groups and X is a member of the class consisting of ethylene, trimethylene and ortho phenylene groups. Examples of such catalysts which are more fully disclosed in the above cited references to Kleinschmidt, Rose et al., and Reppe et al. and also those catalysts described and claimed in copending application of Meriwether, Serial No. 774,150, filed concurrently herewith, now U.S. Patent No. 3,062,573, are nickel di- and tricarbonyl complexes with triphenylphosphine, phenyldiethyl and ethyldiphenylphosphine, tris-, bis- and mono-(2-cyanoethyl)phosphine, triethyl through trioctylphosphine and triethyl- through trioctyl- and triphenylphosphite. Further examples are the nickel carbonyl complexes of the following bidentate ligands, such as tetrakis-(2-cyanoethyl) ethylene diphosphine and tetraethylethylenediphosphine. Moreover, tetrakis(2-cyanoethyl) trimethylenediphosphine is also operative, as well as are other bidentate diphosphines.

The following example is typical of the result of the preconditioning of the catalyst by a non-reactive acetylene whereby polymerization took place spontaneously at room temperature; whereas, without preconditioning the catalyst, no polymerization had occurred after several days.

EXAMPLE

A solution 0.58 mol in 2,5-dimethyl-3-hexyne-2,5-diol and 0.0059 mol in $Ni(CO)_2[P(C_6H_5)_3]_2$ in benzene was refluxed under $CO_2$ for 2.5 hours and then cooled to 23° C. Ethyl propiolate (3.5 ml.) was added, causing a 35° C. exotherm. Seventy-five percent of the propiolate had trimerized in three minutes. When ethyl propiolate was added to a benzene solution of the above catalyst alone at 23° C. no trimerization of the propiolate had occurred after several days.

The following table sets forth more examples which more clearly manifest the scope of the invention.

I claim:
1. A process for producing a catalyst comprising heat reacting a nickel-carbonyl-phosphine complex with an unpolymerizable disubstituted acetylene to produce a nickel-phosphine unpolymerizable acetylene complex.
2. The method of claim 1 wherein the unpolymerizable acetylene is 2,5-dimethyl-3-hexyne-2,5-diol.
3. The method of claim 1 wherein the unpolymerizable acetylene is diphenyl acetylene.
4. The method of claim 1 wherein the unpolymerizable acetylene is diethyl acetylene.
5. The method of claim 1 wherein the unpolymerizable acetylene is the linear trimer of pentyne.
6. The method of claim 1 wherein the unpolymerizable acetylene is 2,7-dimethyl-3,5-octadiyne-2,7-diol.
7. An improved method of polymerizing a polymerizable acetylene which comprises refluxing dicarbonyl-bis-[tris-(2-cyanoethyl)phosphine]nickel represented by the $Ni(CO)_2[P(CH_2CH_2CN)_3]_2$ with 2,5-dimethyl-3-hexyne-2,5-diol in benzene and subsequently adding the polymerizable acetylene to be polymerized wherein said polymerizable acetylene has at least one hydrogen atom attached to an acetylenic carbon atom in the molecule of said polymerizable acetylene.
8. A process for polymerizing a polymerizable acetylene comprising contacting said polymerizable acetylene in solution with a nickel-phosphine unpolymerizable disubstituted acetylene complex, wherein said polymerizable acetylene has at least one hydrogen atom attached to an acetylenic carbon atom in the molecule of said polymerizable acetylene.
9. The method of claim 8 wherein the acetylene being polymerized is a mono-substituted acetylene selected from the class consisting of alkyl, aryl, alkaryl, aralkyl, and hydroxy-substituted alkyl acetylene.

| Non-Reactive Acetylene | Molar Concentration of Non-Reactive Acetylene | Catalyst | Molar Concentration of Catalyst | Solvent | Pretreatment Temp., °C. | Time, hrs. | Reactive Acetylene Added | Molar Concentration of Added Acetylene | Temperature of Polymerization, °C. | Infrared, Percent Reaction |
|---|---|---|---|---|---|---|---|---|---|---|
| Diphenylacetylene | 0.6 | Dicarbonylbis-[tris(2-cyanoethylphosphine)]nickel. | .006 | Acetonitrile | 80 | 1½ | Heptyne-1 | 0.06 | 25 | 70 |
| Do | 0.6 | do | .006 | do | 80 | 1½ | Ethyl Priopolate. | 0.60 | 25 | 70 |
| Do | 0.03 | do | .015 | do | 80 | 2 | do | 1.0 | 25 | 100 |
| 2,7-Dimethyl-3,5-octadiyne-2,7-diol | 0.6 | do | .006 | do | 80 | 2 | do | 0.6 | 25 | 25 |
| Diphenylacetylene | 0.6 | Dicarbonyltetrakis-(2-cyanoethyl) diphosphinenickel. | .006 | do | 80 | 2 | Heptyne-1 | 0.60 | 40 | 30 |
| Diethylacetylene | 0.6 | Dicarbonylbis-(triphenylphosphine)nickel. | .006 | Cyclohexane | 80 | 2 | Ethyl Propiolate | 0.60 | 25 | 100 |
| Pentyne Trimer | 0.6 | do | .006 | do | 80 | 2 | do | 0.60 | 25 | 100 |

The above examples are not intended to limit the scope of the invention but are presented as an aid so that the invention may be more easily understood and performed.

Acetylenes which, in addition to those used in the above examples, can be used as starting monomers for polymerization with preconditioned catalysts include almost all mono-substituted acetylenes. In addition to the acetylenes used in the prior art such as acetylene itself, propargyl alcohol, phenyl acetylene, 2-methyl-butyne-3,2-ol, isopropenyl monoacetylene, etc., other acetylenes such as disclosed in copending application Serial No. 774,152 which includes mono-methyl through mono-octadecyl, mono-cyclopropyl through mono-cycloheptyl and mono-dialkylaminoalkyl acetylenes are found to polymerize.

10. The method of claim 8 wherein the catalyst is selected from the class consisting of compounds represented by the general formulas $Ni(CO)_{4-n}(RR'R''P)_a$ and $Ni(CO)_2(RR'PXPRR')$ wherein R, R', and R'' are members of the class consisting of alkyl, aryl, aryloxy, and cyanoethyl groups.

References Cited in the file of this patent

UNITED STATES PATENTS 2,274,988    Matuszak    Mar. 3, 1942
2,542,417    Kleinschmidt    Feb. 20, 1951

OTHER REFERENCES

Reppe et al.: Annalen (Liebig), vol. 560 (1948), pp. 104–116 (13 pages).

UNITED STATES PATENT OFFICE
CERTIFICATE OF CORRECTION

Patent No. 3,117,952                    January 14, 1964

Lewis S. Meriwether

It is hereby certified that error appears in the above numbered patent requiring correction and that the said Letters Patent should read as corrected below.

Column 1, lines 25 and 57, for "catalyst", each occurrence, read -- catalysts --; columns 3 and 4, in the table, under the heading, "Molar Concentration of Added Acetylene", first entry thereof, for "0.06" read -- 0.60 --; column 4, line 55, for "$Ni(CO)_{4-n}(RR'R''P)_a$" read -- $Ni(CO)_{4-n}(RR'R''P)_n$ --.

Signed and sealed this 9th day of June 1964.

(SEAL)
Attest:

ERNEST W. SWIDER
Attesting Officer

EDWARD J. BRENNER
Commissioner of Patents